T. K. MEECH.
Seat for Vehicles.
No. 207,193. Patented Aug. 20, 1878.
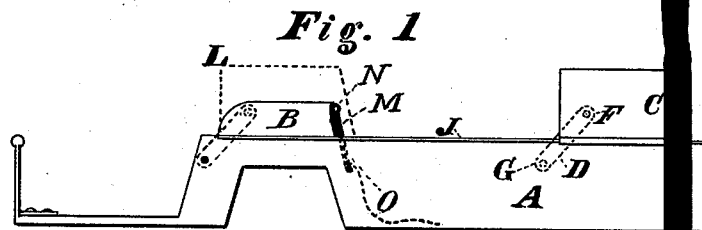
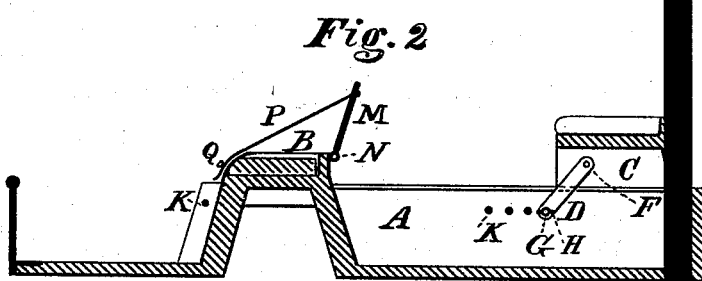
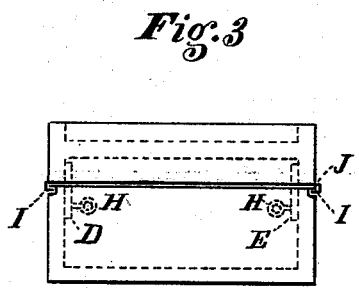

UNITED STATES PATENT OFFICE.

THOMAS K. MEECH, OF BUFFALO, NEW YORK.

IMPROVEMENT IN SEATS FOR VEHICLES.

Specification forming part of Letters Patent No. 207,193, dated August 20, 1878; application filed July 1, 1878.

*To all whom it may concern:*

Be it known that I, THOMAS K. MEECH, of the city of Buffalo, in the county of Erie and State of New York, have invented certain new and useful Improvements in Carriages or Wagons, which improvements are fully set forth in the following specification and accompanying drawing, in which—

Figure 1 is a side elevation; Fig. 2, a vertical longitudinal section through the center of the wagon body and seat, and Fig. 3 represents an end view.

My invention relates to certain improvements in carriages or light wagons; and it consists of a shifting seat made sufficiently higher than the front or stationary seat, so that when only one seat is required the movable one will pass over it, provided with inwardly-projecting flanges on the lower parts of the sides, which project over a slideway on the top part of each side of the wagon-body, so that the seat may be securely held to the slideways, but easily moved along them, in combination with two arms jointed thereto, and provided with thumb-screws, whereby the seat may be held securely at any point of its adjustment along the body of the wagon, as will be more clearly hereinafter shown by reference to the drawing, in which—

A represents the body of a light wagon; B, the front or stationary seat; C, the shifting seat. It is provided with two arms, D E, jointed thereto at F. They are perforated at G to admit a thumb-screw, H. I represents a flange on each side of the shifting seat, which is made so as to form a groove on each side to fit the slideways J, as shown in Fig. 3. K represents screw-holes on the inner sides of the wagon-box to receive the thumb-screws H, whereby the seat may be shifted and fastened at the point desired.

When only one seat is required the arms D E are turned up, and the shifting seat is moved forward and then carried to a position covering the seat B, and by means of the arms D E and thumb-screws H is fastened, as shown by the dotted lines L, Fig. 1, thereby forming a single seat, and leaving more room at the back of the wagon-box for other things when required.

M represents the adjustable back, jointed to the seat at N, (see Fig. 2,) so that it may be turned back out of the way, as shown by dotted lines O in Fig. 1. It is held up, as in Fig. 2, by the straps P and buttons Q. Ordinary buckles would answer the same purpose.

A carriage-top may be attached to the movable seat, so as to be shifted with it if required.

I claim as my invention—

The combination, in a wagon, of the seat B, secured immovably near the front, the ways J, extending past the front seat to the rear, and the seat C, open at the front, sliding on the ways, adapted to cover the front seat, and provided with arms D and screws H for securing it after adjustment, as set forth.

THOS. K. MEECH.

Witnesses:
 JAMES SANGSTER,
 A. J. SANGSTER.